June 9, 1953 M. H. RIPPLE 2,641,334
SUCTION CLEANER FILTER

Filed July 5, 1951 4 Sheets-Sheet 1

INVENTOR.
Melvin H. Ripple
BY
Harry S. Dumasse
ATTORNEY.

June 9, 1953 M. H. RIPPLE 2,641,334
SUCTION CLEANER FILTER
Filed July 5, 1951 4 Sheets-Sheet 2

INVENTOR.
Melvin H. Ripple
BY
Harry S. Dunaser
ATTORNEY.

June 9, 1953  M. H. RIPPLE  2,641,334
SUCTION CLEANER FILTER

Filed July 5, 1951 4 Sheets-Sheet 3

INVENTOR.
Melvin H. Ripple
BY
Harry J. Dumars
ATTORNEY.

June 9, 1953   M. H. RIPPLE   2,641,334
SUCTION CLEANER FILTER

Filed July 5, 1951   4 Sheets-Sheet 4

INVENTOR.
Melvin H. Ripple
BY
Harry S. DeMarsh
ATTORNEY.

Patented June 9, 1953

2,641,334

UNITED STATES PATENT OFFICE 2,641,334

SUCTION CLEANER FILTER

Melvin H. Ripple, Canton, Ohio, assignor to The Hoover Company, North Canton, Ohio, a corporation of Ohio Application July 5, 1951, Serial No. 235,257

11 Claims. (Cl. 183—51)

My invention relates to the art of suction cleaning devices and more particularly to a filter therefor and means of detachably securing the filter in operative relation to the exhaust outlet of suction cleaning apparatuses.

It is an object of my invention to provide a suction cleaner filter having one end thereof permanently closed and its other end openable into a wide mouth having a perimeter which is substantially the maximum of the entire filter structure to facilitate complete emptying of the filter and to eliminate the possibility of retaining embedded dirt in folds therein. It is a further object of my invention to provide a filter of the foregoing character in which the filter mouth encompasses a frame arranged to open to the maximum perimeter of the filter mouth and to fold into a structure having a small opening adapted to fit about and grasp an exhaust fitting on a suction cleaner to anchor and seal the filter thereto. It is a further object of my invention to provide a folding filter mouth frame in which portions of the frame fold the parts of the filter not engaged about the cleaner exhaust duct against the exhaust duct exteriorly of the said engaging parts at the rear thereof to provide diagonal folds extending up to the rear of the filter bag where they will not mar the appearance of the bag and reduce the same smoothly to a small neck at the bottom which will conform to the size of the exhaust fitting on the cleaner. It is a further object of my invention to provide a suction cleaner filter having a mouth frame openable to substantially the maximum perimeter of the filter for emptying purposes and foldable to reduce the opening to the small size required for the cleaner exhaust fitting and automatically to secure and seal the filter due to a toggle action built into the mouth frame so that the mouth frame not only serves to fold the filter mouth into a small opening but also to seal the folded parts thereof against leakage and to secure the filter to the cleaner exhaust fitting.

Other objects and advantages of the invention will become apparent as the description proceeds when taken in connection with the accompanying drawings, wherein.

Figure 1:
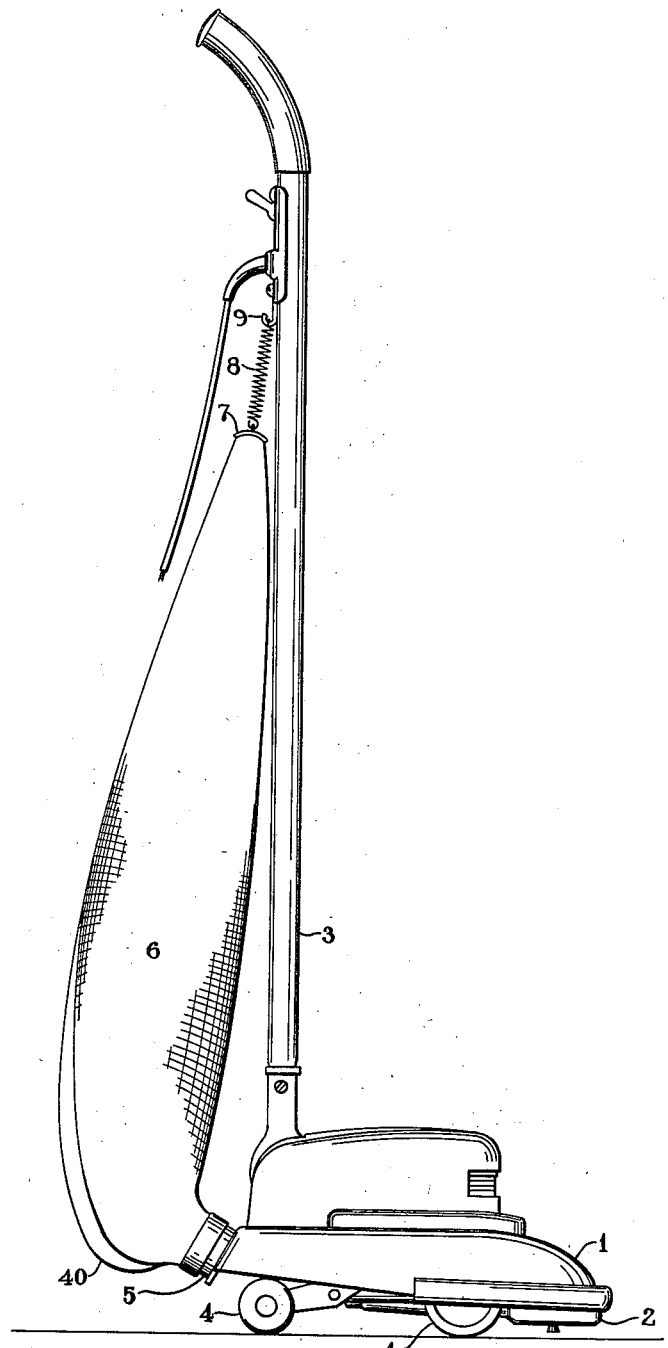
Figure 1 is a small scale side elevational view of a suction cleaner embodying my invention.

Referring now to the drawing in detail, and first to Figure 1 thereof, I illustrate a suction cleaning apparatus 1 having a cleaning nozzle 2 and a pivoted propelling handle 3. The cleaner is supported upon surface engaging wheels 4 which support the same upon a surface to be cleaned. The cleaner is provided with an exhaust outlet fitting 5, connected in a manner to be described hereinafter, to a tubular fabric filter 6. The upper end of the filter 6 is permanently closed and carries a rigid or semi-rigid bracket plate 7 to which a tension supporting spring 8 is connected. The upper end of the tension supporting spring 8 is carried by a hook 9 supported from the upper or propelling hand grip end of the handle 3.

Figure 2:
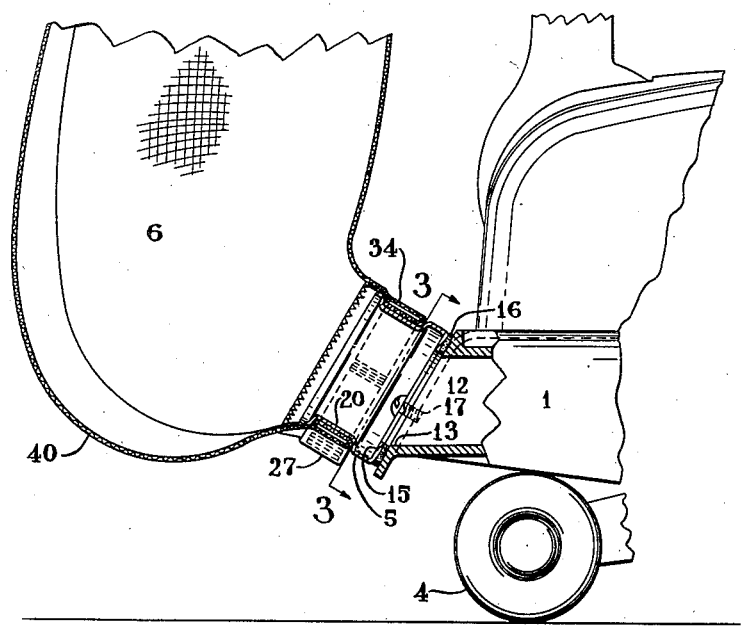
Figure 2 is a partial sectional view of the rear end of a suction cleaner illustrating my filter attached to the exhaust fitting.
Figure 3:
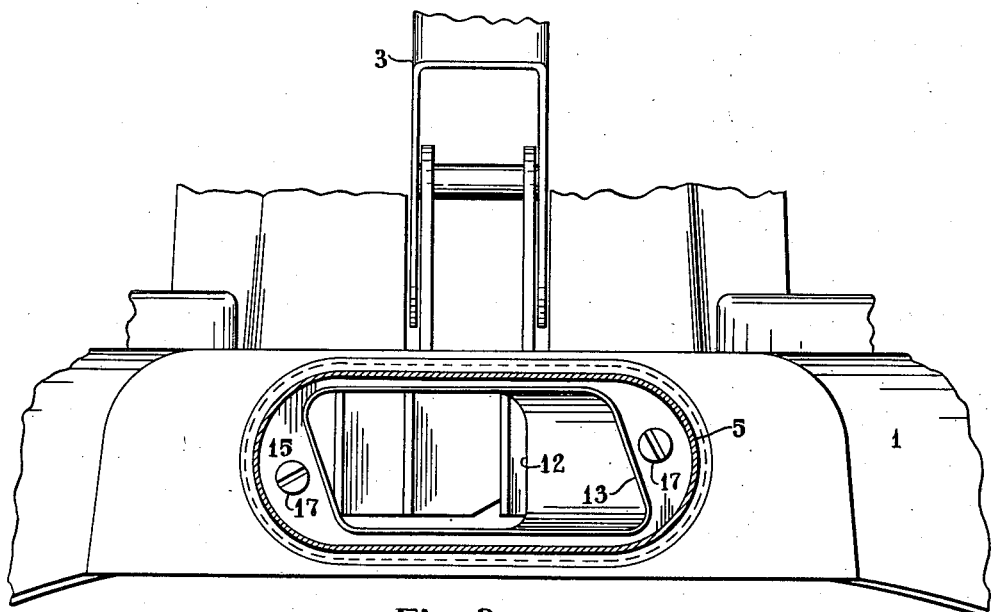
Figure 3 is a sectional view taken along the line 3—3 of Figure 2 and looking in the direction of the arrows.

The main body of the cleaner 1 is provided with an exhaust passageway 12 terminating in a port 13 facing upwardly and rearwardly of the cleaner at an angle to the supporting surface as shown in Figure 2. The filter mounting member 5 is tubular and is provided with an inwardly directed base flange 15 having an opening therein conforming to the opening 13 and seating upon a gasket 16 which rests upon the main body of the cleaner 1 about the opening 13. A pair of studs 17 engage through the flange 15 and gasket 16 and thread into the body 1 to secure the filter connecting member 5 to the cleaner body. The filter connecting member 5 is reduced in diameter outwardly of the flange 15 to provide an annular filter mounting channel section 20.

Figure 4:
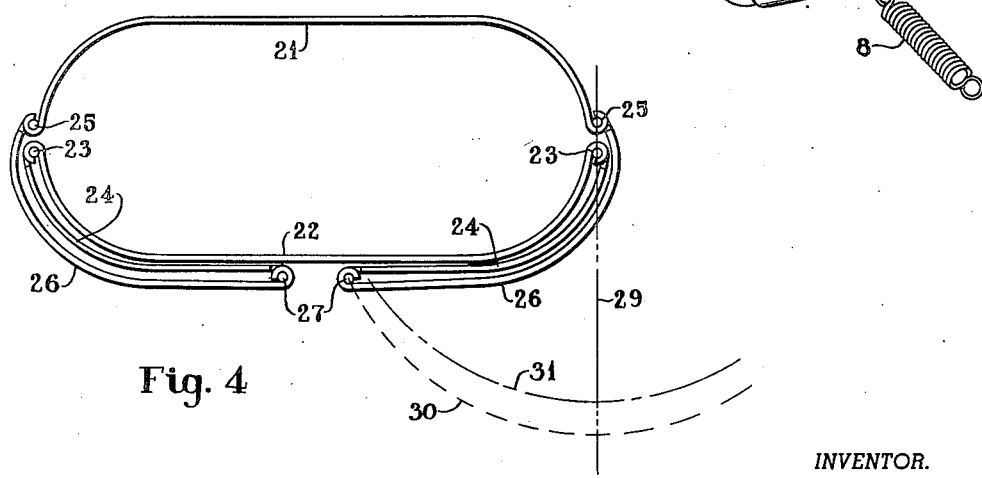
Figure 4 is a plan view of a filter mouth frame shown in folded condition.

Referring now to Figure 4, a filter mounting frame is illustrated in folded condition. The mouth frame consists of a pair of principal members 21 and 22 in opposed relation which are shaped to engage in the annular channel 20 with a snug fit to seal the filter thereto in a manner to be described more fully hereinafter. The ends of the member 22 are provided with hinges 23 pivotally supporting rigid hinge leaf or folding members 24 which are curved to conform to the shape of the members 22 as indicated in Figure 4. The members 21, 22 and 24 are preferably of substantially rigid strip stock which is shaped to the desired configuration. The ends of the member 21 are provided with hinges 25 pivotally supporting hinge leaf or folding members 26 constructed of strip stock having substantially the same cross section as the stock of the members 21, 22 and 24. The members 26 are of spring material and are preformed to assume a slightly greater curvature than that shown in Figure 4 in their relaxed condition. The folding members 24 and 26 are arranged in pairs forming folding hinges each of which comprises one member 24 and one member 26 joined, respectively, to corresponding, abutting when folded, ends of the opposed members 22 and 21. The members 24 and 26 constituting each folding hinge are pivotally joined at their ends not directly connected to members 21 and 22 by hinges 27. Each of the folding hinges forms a snap acting toggle a dead center indicated by the construction line 29. The toggle action will be explained only in reference to the right hand hinge of Figure 4 but the left hand hinge of Figure 4 operates identically. The toggle action results from the resiliency of the member 26 and the spaced relation of the corresponding hinges 23 and 25. The construction line 30 is the path of movement of the hinge 27 pivoting about the hinge 23. The construction line 31 is the path of movement which would be generated by the hinge 27 if allowed to pivot with the member 26 freely about the hinge 25. It is apparent, from the relation of these two construction lines, that the rigid folding member 24 stresses and straightens the resilient member 26 as it rotates to the full line position of Figure 4. The point of maximum tension upon the member 26 occurs when the pivot 27 lies on the construction line 29. Further movement of these parts in a clockwise direction, as illustrated in Figure 4, allows some relief of the tension in the member 26 and some increase in the curvature thereof. Consequently, the parts move to the full line position of Figure 4 with a snap action once the hinge 27 is forced past the construction line 29.

Figure 5:
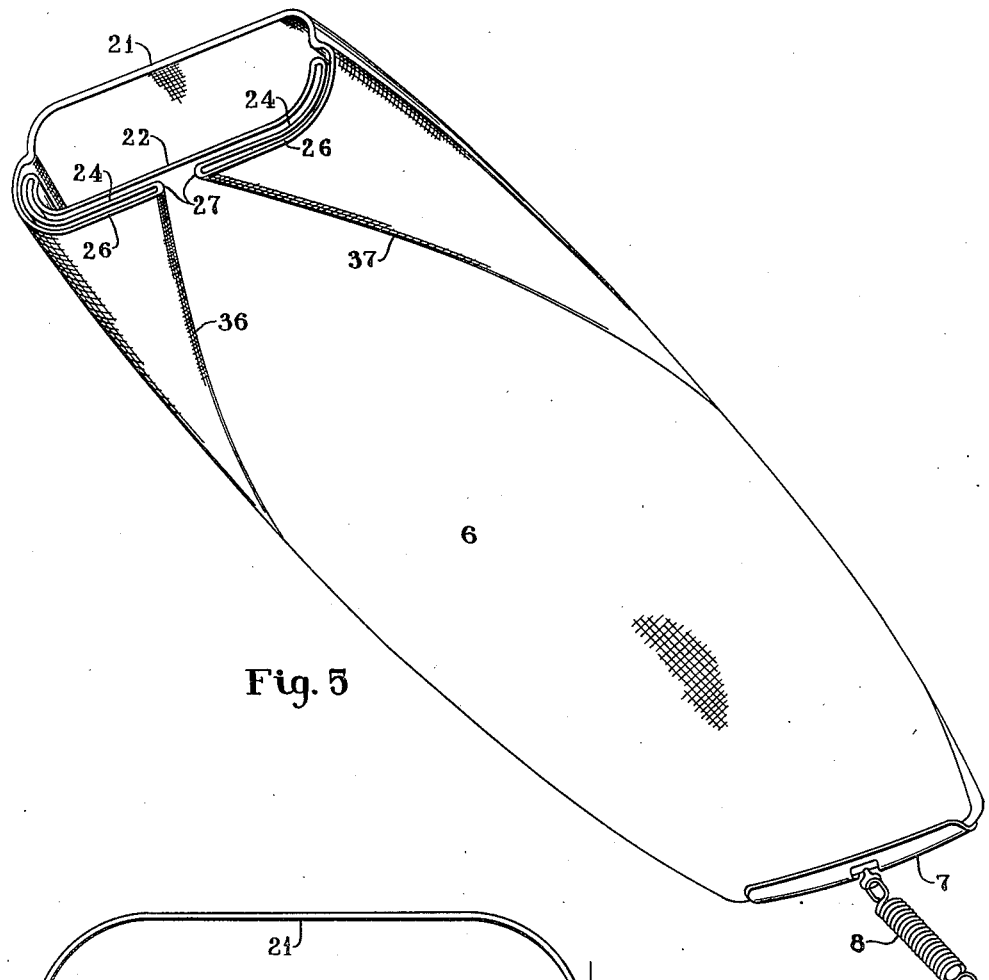
Figure 5 is a bottom perspective view of my filter in folded condition.
Figure 6:
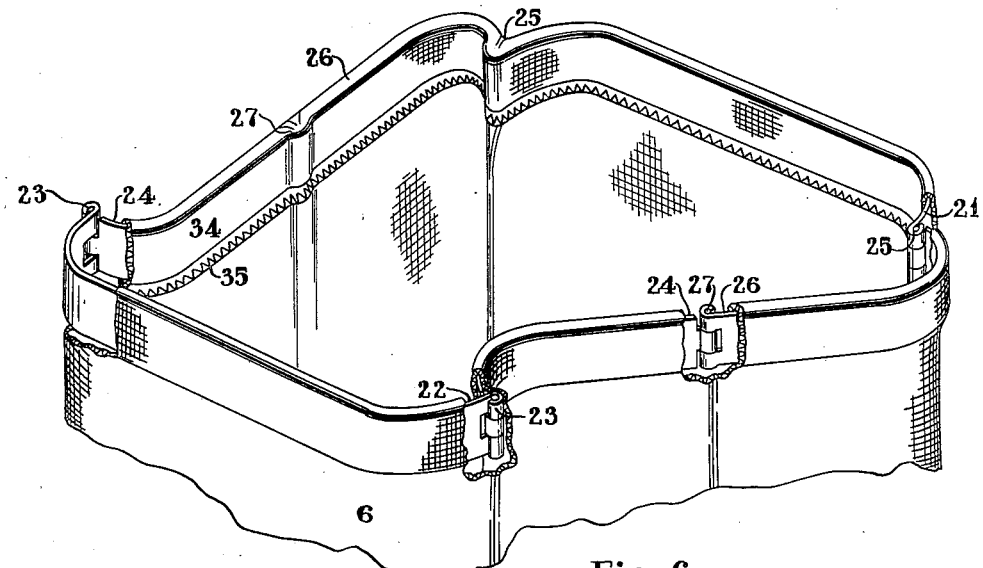
Figure 6 is a partial bottom perspective view of my filter showing the mouth in the open emptying condition thereof.

The filter frame is encased in a hem 34 of the tubular filter 6, formed by overcasting the end of the filter around the frame and then stitching the overcast end of the filter to the main body of the filter, as indicated at 35, see Figure 6. In Figures 5 and 6, all parts of the filter mouth are given the reference characters applied to the encased portions of the frame even though these parts are not visible in Figure 6, in order to correlate Figures 4 to 6 showing the folded and unfolded conditions of the frame and filter mouth.

The folded condition of the filter is illustrated in Figure 5 and shows the pair of diagonal pleats, indicated generally by the reference characters 36 and 37, extending up one side of the filter bag 6 to reduce the same smoothly to the small inlet mouth formed when the parts are in folded condition.

Assuming the filter to be in the condition illustrated in Figure 6, the filter is assembled with the filter mounting member 5 by first placing the member 21 in the channel 20 on the top side thereof. The hinges 27 are next grasped and rotated outwardly and upwardly to pull the member 22 into engagement with the underside of the channel 20 and to bring the corresponding pairs of hinges 23, 25 into juxtaposed relation. The hinges 27 are next rotated downwardly to the dead center positions indicated by the construction line 29, accompanied by a gradual tensioning and straightening of the members 26. Once the line 29 is passed, the tension in the members 26 causes the hinges 27 to swing into folded condition with a snap action. As the parts snap into the assembled condition, the tension of the spring members 26 forces the members 21 and 22 toward each other in firm engagement with the bottom of the channel 20. This presses the cloth surrounding the members 21 and 22 into the channel to form a seal at this point. Similarly, the members 24 are forced into engagement with the outer face of the member 22 and the members 26 are forced into engagement with the outer faces of the members 24, thus pressing the fabric surrounding these elements tightly together forming a seal at these points also. The space between the hinge points 23, 25, shown in Figure 4, accommodates the fabric surrounding the hinges which complete the seal around the exhaust outlet in the channel 20. The formation of the member 26 is such that it assumes substantially the position illustrated in Figure 4 in its folded condition, though still under tension, and firmly engages the member 24 throughout its length and the end of the hinge 23 form a continuous seal. Since the parts are spring-forced into the channel 20, the same means which serves to fold the mouth of the filter into a small size opening and to seal the same also serves to anchor the filter to the cleaner body. A longitudinal pull on the filter in the folded, applied condition of Figure 2 pulls the one edge of the mouth frame thereof against a side wall of the channel 20 and cannot dislodge the filter from the cleaner.

As shown most clearly in Figures 1 and 2, the central rear portion of the filter is cut full as indicated at 40 to provide a dirt trap which is positioned rearwardly of and below the outlet of the filter mounting conduit 5, in order to prevent massed dirt from blocking the exhaust outlet of the cleaner. When it is desired to remove the filter, the operator grasps the hinges 27 rotating them outwardly and away from each other over the center points of the toggle after which the members snap to the fully released position, allowing ready separation of the members 21 and 22 and removal thereof from the channel 20 for emptying or other cleaning operations upon the filter structure.

The apparatus heretofore described is complete in itself in every particular, performing the functions of folding the bag mouth, sealing the same into a small operating opening fitting the exhaust opening of the suction cleaner and positively clamping the filter to the suction cleaner due to the automatic action of the filter mouth frame. The foregoing automatic action is dependent upon the toggle action provided by the spring elements 26 and their relation to the relatively rigid element 24. This arrangement is entirely satisfactory if the design and configuration of the cleaner exhaust port and the manufacturing tolerances permit a substantial toggle action to be obtained, such as that shown in Figure 4 of the drawing hereof. However, the size and configuration of the cleaner exhaust port in conjunction with manufacturing tolerances may not assure sufficient toggle action to form a perfectly safe retaining means for the filter during rough usage and to insure the same against accidental engagement of the hinges 27 and release of the filter. Where such conditions obtain, an auxiliary securing device is desirable. The apparatus shown in Figure 7 is designed to meet the foregoing special circumstances.

Figure 7:
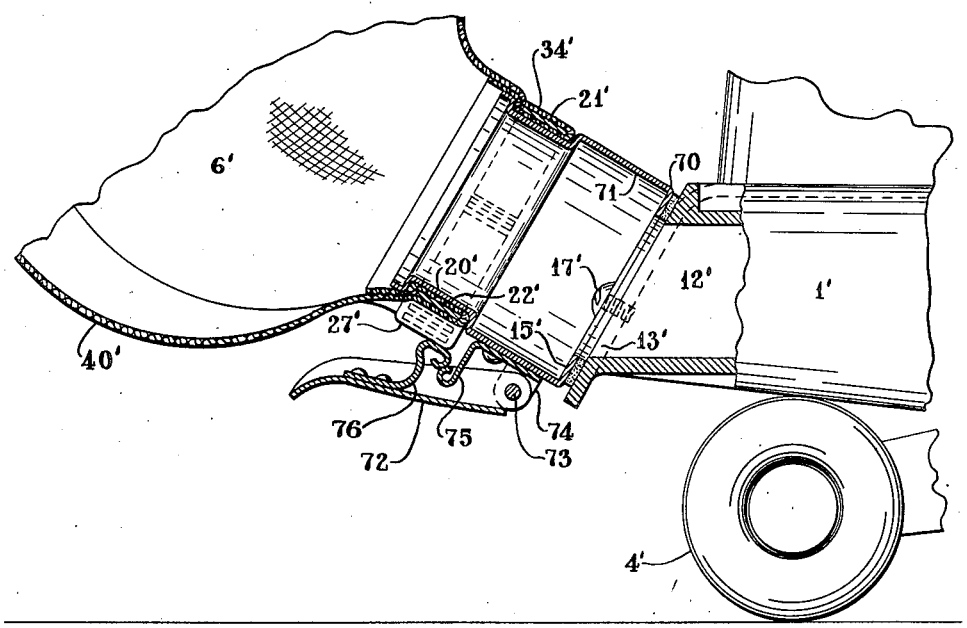
Figure 7 is a side elevational view similar to Figure 2 illustrating a modification of the invention.

The apparatus shown in Figure 7 is, for the most part, identical with that shown in Figures 1 to 6 and those portions of the apparatus in Figure 7 which have identical counterparts described in connection with Figures 1 to 6 are given the same reference characters distinguished by the addition of a prime.

In the form of the invention illustrated in Figure 7, the cleaner exhaust fitting 70 contains an elongated tubular section 71 extending between the attaching and sealing flange 15' and the channel section 20'. In other particulars, the cleaner exhaust fitting 70 is identical with the exhaust fitting 5. For simplicity in describing the invention, the filter and its folding mouth are shown and are described herein as being identical with that previously described in connection with Figures 1 to 6, though the cross section of the member 70 may be varied widely depending upon the design of the particular suction cleaner to which it is attached.

A latch arm 72 is pivotally supported at 73 upon an ear 74 projecting downwardly from the underside of the member 71. A latch keeper element 75 is secured to the tubular member 71 in position to clear the various parts of the filter mouth frame as the same is folded or unfolded to engage or disengage the channel 20'. The latch finger 72 carries a spring tab 76 which is broad enough to span the distance between the adjacent end hinge portions 27' of the folded filter mouth frame structure and to engage each of these elements to hold the same firmly in engagement with the mouth frame member 22' so as to prevent positively any action tending to open out the members 27' 27' and release the mouth frame from the fitting 70. The spring member 76 is shaped to latch with the member 75 to form a positive spring retained holder for the ends of thhe mouth frame. A downward pressure applied to the free end of the latch arm 72 will force the latch spring 76 out of engagement with the keeper 75, releasing the ends 27' 27' of the filter mouth frame. When so released, the latch arm 72 pivots downwardly about the pivot 73 out of the way of the filter mouth frame elements as they are folded or unfolded. In applying the filter mouth frame, the procedure outlined in connection with Figures 1 to 6 is followed until the filter mouth frame is engaged in the channel 20. The latch finger 72 is then operated to the position shown in Figure 7 to provide positive securing means for the folded mouth frame.

The present invention provides a filter having a wide emptying mouth foldable into a small opening of a size to engage about a cleaner exhaust conduit and to contour the filter fabric smoothly to the small inlet opening. The folding mouth frame also inherently seals the folded end of the filter and secures the same to the filter exhaust conduit.

While the invention has been illustrated and described in detail herein, it is not to be limited thereto but various changes may be made in the construction, design and arrangement of parts without departing from the spirit of the invention or the scope of the appended claims.

I claim:

1. A suction cleaning apparatus having an exhaust duct communicating with an exhaust and filter mounting conduit, a tubular filter member closed at one end and having an open end forming an air inlet and emptying mouth, a frame secured to the mouth of said filter member and comprising a pair of opposed principal members shaped to engage about said exhaust conduit with their corresponding ends in abutting relation, a hinge leaf member hingedly joined to each end of each of said principal members, and means hingedly joining the hinge leaf members joined to corresponding ends of said principal members, each pair of said hingedly joined hinge leaf members being shaped to fold together against the outer face of one of said principal members.

2. Apparatus according to claim 1 in which the hinge leaf members joined to said one of said principal members are rigid, the hinge leaf members joined to the other of said principal members are resilient and are of lesser length when unstressed than the distance between their ends in the folded condition of said frame.

3. A suction cleaning apparatus having an exhaust duct communicating with an exhaust and filter mounting conduit, a tubular filter member closed at one end and having an open end forming an air inlet and emptying mouth, said filter mouth being larger than said exhaust conduit, a frame secured to said filter mouth including a pair of opposed members positioned on opposite sides of said filter mouth and shaped to seal about said exhaust conduit, a folding hinge structure joining each pair of corresponding ends of said opposed members and openable to space said opposed members to open said filter mouth to its full extent, each of said hinge structures being shaped to fold together against the outer face of one of said opposed members to secure said opposed members about said exhaust conduit and to close the portions of said filter mouth not engaged with said exhaust conduit.

4. A filter for suction cleaning apparatus comprising a tubular body of filtering material closed at one end and open at its other end, a frame structure secured to said tubular body at the opened end thereof, said frame structure including a pair of opposed members shaped to define an inlet to said tubular body when brought together, a folding structure pivotally attached to each pair of corresponding ends of said principal members and openable to space said opposed members to spread the open end of said tubular body to its full extent, said folding structures each being shaped to fold together against the outer face of one of said opposed members when said opposed members are brought together, and each of said folding structures including a resilient member whose end portions lie a lesser distance apart when unstressed than when folded against said one of said opposed members.

5. A filter for suction cleaners comprising an elongated tubular body of filter material having a closed end and an open end, a mouth frame secured to the open end of said filter body, said frame comprising a pair of opposed members shaped to define an inlet to said filter body smaller than the open end thereof when brought together with their corresponding ends in abutting relation, a hinge leaf pivotally connected to each end of each of said members, means hingedly joining the hinge leaves joined to corresponding ends of said members, the hinge leaves joined to one of said members being shaped to fold against the outer surface of said one member, and the hinge leaves joined to the other of said members being shaped to fold against the outer surface of the hinge leaf to which it is joined around one of the ends of said one member.

6. Apparatus according to claim 5 in which said hinge leaves are movable between an open position in which opposed members are spaced apart and closed position in which the corresponding ends of said opposed members are in abutting relation and each pair of abutting corresponding ends of said opposed members lies on a line intersecting the path of movement of the joined ends of the hinge leaves joined to such pair of corresponding ends when moving to or from the folded position thereof.

7. Apparatus according to claim 5 in which one of the hinge leaves of each pair thereof is biased to draw its ends together in the folded position of said hinge leaves.

8. Apparatus according to claim 1 including a latch mechanism carried by said conduit for engaging said folded portions of said filter to retain said filter mouth in said engaged and folded position.

9. In a suction cleaning apparatus having an exhaust conduit, a tubular filter having a closed end and an open end forming an air inlet and emptying mouth for said filter which is larger than said conduit, a foldable frame secured to the mouth of said filter comprising a plurality of hingedly connected members, a first group of said frame members being shaped to engage about said conduit and a second group of said frame members being shaped to fold against and engage certain of said first group of frame members with a snap action to seal said filter mouth about and to secure said filter mouth to said exhaust conduit.

10. In a suction cleaning apparatus having an exhaust conduit, a tubular filter having a closed end and an open end forming an air inlet and emptying mouth for said filter which is larger than said conduit, a foldable frame secured to the mouth of said filter comprising a plurality of hingedly connected members, a first group of said frame members being shaped to engage about said conduit and a second group of said frame members being shaped to fold against and engage certain of said first group of frame members; certain of said frame members being resilient and the distance between the ends of each of said resilient members being such that said members are first stressed and then partially relieved of stress when moved from open position to folded position whereby said filter mouth is folded about and in sealed relation to said exhaust conduit with a snap action.

11. A filter for suction cleaners comprising an elongated tubular body of filter material having a closed end and an open end, a foldable frame comprising a plurality of hingedly joined members secured to the open end of said filter body, a first group of said frame members being shaped to fold together to define an inlet to said filter body smaller than the open end of said filter body when unfolded and fully open, a second group of said frame members being shaped to fold against certain of said first group of frame members to close and seal the portions of the open end of said filter not included in said inlet, and certain of said second group of frame members being resilient and of such distance between the ends thereof that they are first stressed and then partially relieved of stress as they are moved to fold against said first group of members.

MELVIN H. RIPPLE.

References Cited in the file of this patent
UNITED STATES PATENTS

| Number | Name | Date |
|---|---|---|
| 1,524,296 | Field | Jan. 27, 1925 |
| 1,774,589 | Broeske | Sept. 2, 1930 |
| 2,060,776 | Bender | Nov. 10, 1936 |